US007000628B2

(12) United States Patent
Ruesch et al.

(10) Patent No.: US 7,000,628 B2
(45) Date of Patent: Feb. 21, 2006

(54) ELECTRONIC AIR SEPARATION SYSTEM

(75) Inventors: James R. Ruesch, Lindenhurst, IL (US); James S. Nerstrom, Green Oaks, IL (US); Thomas T. Tschanz, Lake Forest, IL (US)

(73) Assignee: Liquid Controls, Lake Buff, IL (US)

( * ) Notice: Subject to any disclaimer, the term of this patent is extended or adjusted under 35 U.S.C. 154(b) by 0 days.

(21) Appl. No.: 10/764,964

(22) Filed: Jan. 26, 2004

(65) Prior Publication Data

US 2005/0161084 A1    Jul. 28, 2005

(51) Int. Cl.
*G05D 9/12* (2006.01)
(52) U.S. Cl. .................. 137/2; 137/173; 137/174
(58) Field of Classification Search ............... 137/173, 137/174, 2
See application file for complete search history.

(56) References Cited

U.S. PATENT DOCUMENTS

| | | | | |
|---|---|---|---|---|
| 4,082,106 A | * | 4/1978 | Butcher | 137/174 |
| 5,922,969 A | | 7/1999 | Haar | |
| 6,047,720 A | * | 4/2000 | Stein | 137/199 |
| 6,199,574 B1 | * | 3/2001 | Harris | 137/199 |

FOREIGN PATENT DOCUMENTS

| | | |
|---|---|---|
| DE | 23 35 238 A1 | 1/1975 |
| EP | 0 895 960 A1 | 2/1999 |

* cited by examiner

*Primary Examiner*—Gerald A. Michalsky
(74) *Attorney, Agent, or Firm*—Miller, Matthias & Hull

(57) ABSTRACT

A liquid flow metering system is disclosed which includes a pump disposed between a liquid supply and a reservoir. The reservoir includes an inlet connected to the pump, an air/liquid outlet and a liquid outlet. The air/liquid outlet is connected to an air separation chamber. The liquid outlet is connected to a flow meter and a liquid outlet valve. The air separation chamber is connected to an air outlet. The air outlet is connected to an air release valve. The air separation chamber accommodates an optical sensor for sensing the presence of air in front thereof and within the air separation chamber. The optical sensor, air release valve and liquid outlet valve are all linked to a controller. When the optical sensor senses air in front of the optical sensor, the sensor sends a signal to the controller to open the air release valve and close the liquid outlet valve. Conversely, when the optical sensor senses liquid in front of the optical sensor, the optical sensor sends a signal to the controller to close the air release valve and open the liquid outlet valve.

22 Claims, 1 Drawing Sheet

ELECTRONIC AIR SEPARATION SYSTEM

TECHNICAL FIELD

An improved air separator for use with a liquid flow metering device is shown and described. More specifically, the air separator utilizes an electronic optical liquid level sensor to control the liquid output valves and activates an air release valve thereby preventing air/liquid mixtures from passing through the flow meter and the outlet valve.

BACKGROUND OF THE RELATED ART

Liquid product is commonly delivered to a customer and the amount of liquid product is often measured by a liquid flow meter as the product is pumped from a supply tank or truck tank to the customer's storage tank. The accuracy of such liquid flow meters is often controlled by state and/or federal regulations. As the supply tank used to transport the liquid product becomes empty, a mixture of air and liquid can be pumped by the delivery pump and through the liquid flow meter to the customer's storage tank. This mixture of air and liquid through the flow meter causes the flow meter to inaccurately measure the amount of liquid product delivered as both air volume and liquid volume are measured by conventional flow meters. Thus, it is often necessary to remove or separate the air from the liquid during the delivery process in order to accurately measure the amount of liquid delivered.

This problem is particularly prevalent when petroleum products are delivered to a customer's storage tank using a delivery truck. To ensure that the customer gets the amount of liquid product paid for, a so-called "split compartment" test or product depletion test is carried out. A compartment of the delivery truck (i.e., supply tank) must be drained completely during the delivery process causing the truck's pump to suck air and liquid into the metering line. To pass this test, the air must be exhausted before the air can be pumped through the liquid flow meter with the liquid and out the delivery hose. By sensing the air/liquid mixture and eliminating the air, one prevents an over registration of the actual liquid product delivered.

Therefore, air separation systems have been developed to address this problem. Traditional air separation systems rely upon a float system with an additional level-sensing chamber disposed above the chamber that includes a strainer that is in-line upstream of the liquid flow meter. The level-sensing chamber typically houses the float. When the float drops below a predetermined level, the system actuates a mechanical valve that releases air from the level-sensing chamber upstream of the liquid flow meter. Such systems may also shut off flow to the liquid flow meter until the float rises above the predetermined level indicating that the chamber includes a sufficient amount of liquid so that metering can recommence.

The disadvantages of these systems include leaks in the float, wear and tear of the float and valve mechanism, valve seal degradation and other various leakage problems.

More recently, electronic sensors have been employed with electrically actuated valves. However, these systems utilize in-line sensing devices such as dielectric constant sensors or density sensing probes. These sensors are expensive, require sophisticated electronics and require frequent calibration that result in higher costs than the previously used mechanical air separators.

Therefore, there is a need for an improved air separation system which is economical to manufacture and which requires only infrequent servicing or maintenance.

SUMMARY OF THE DISCLOSURE

In satisfaction of the aforenoted needs, an improved liquid metering system is disclosed which comprises a pump disposed between a liquid supply and a reservoir. The reservoir comprises an inlet connected to the pump, an air/liquid outlet and a liquid outlet. The air/liquid outlet is connected to a bubble chamber or air separation chamber where the air bubbles up through the liquid and stratifies vertically above the liquid. The liquid outlet is connected to a flow meter and a liquid outlet valve. The upper region of the air separation chamber is connected to an air outlet. The air outlet is connected to an air release valve. The air separation chamber accommodates an optical liquid level sensor for sensing whether air or liquid is in front of the optical sensor within the air separation chamber. The optical liquid level sensor, air valve and liquid outlet valve are all linked to a controller or control mechanism. The controller may be in the form of a computer, relay board or circuit board. When the optical sensor senses air, air bubbles, or foam in front of the optical sensor, the sensor sends a signal to the controller to open the air release valve and close the liquid outlet valve. Conversely, when the optical sensor senses liquid in front of the optical sensor, the optical sensor sends a signal to the controller to close the air release valve and open the liquid outlet valve.

Thus, the sensing of excessive air in the air separation chamber causes the air release valve to be open releasing excess air and the liquid outlet valve to be closed thereby preventing a combination of air and liquid flowing through the outlet valve and through the flow meter before the air is sufficiently exhausted.

In an embodiment, the controller is a relay and when the optical sensor senses air in front of the optical sensor, the relay shuts the liquid outlet valve and opens the air release valve and when the optical sensor senses liquid in front of the optical sensor, the relay shuts the air release valve and opens the liquid outlet valve.

In another embodiment, the optical sensor comprises a twelve volt switch that is off when air is in front of the optical sensor and that is on when liquid is in front of the optical sensor. The air release valve and outlet valves are each solenoid valves. The controller comprises two transistors in series with the first transistor linked to the air release valve and a second transistor linked to the outlet valve. When the twelve volt switch of the optical sensor is off, the air release valve is open and the liquid outlet valve is closed. Conversely, when the twelve volt switch of the optical sensor is on, the liquid outlet valve is open and the air release valve is closed.

In a refinement of this embodiment, a low flow liquid outlet and low flow liquid outlet valve are connected in parallel to the primary liquid outlet and primary liquid outlet valve. The low flow liquid outlet valve is also a solenoid valve. The controller further comprises a third transistor in parallel with the second transistor and the third transistor is linked to the low flow liquid outlet valve. When the twelve volt switch of the optical sensor is switched from the on to the off position, the low flow liquid outlet valve is closed if it was open when air is sensed by the optical sensor.

In yet another embodiment somewhat opposite to that discussed above, the optical sensor comprises a twelve volt switch which is on when air is in front of the optical sensor and that is off when liquid is in front of the optical sensor. The air release valve and outlet valves are each solenoid valves and the controller comprises two transistors in a series with the first transistor linked to the air release valve and the second transistor linked to the liquid outlet valve. When the twelve volt switch of the optical sensor is on, the air release valve is open and the liquid outlet valve is closed. When the twelve volt switch of the optical sensor is off, the liquid outlet valve is open and the air release valve is closed.

In a refinement of this embodiment, a low flow liquid outlet and a low flow liquid outlet valve are connected in parallel to the liquid outlet and liquid outlet valve. The low flow liquid outlet valve is also a solenoid valve. The controller further comprises a third transistor in parallel with the second transistor. The third transistor is also linked to the low flow liquid outlet valve. When the twelve volt switch of the optical sensor switches from the on to the off position, a low flow liquid outlet valve is closed if it is open when air is sensed by the optical sensor.

In a refinement, the reservoir may accommodate a strainer disposed between the inlet and liquid outlet.

In another refinement, the optical sensor may comprise an optical prism and a solid state switch having an off position when air is in front of the optical prism and an on position when liquid is in front of the optical prism. The optical sensor may be mounted through a sidewall of the air separation chamber. Conversely, the solid state switch of the optical sensor may be in the on position when air is front of the optical prism and in the off position when liquid is in front of the optical prism.

In another refinement, the air separation chamber is disposed directly on top of the reservoir.

In another refinement, an air liquid separator may be provided without a flow meter and is applicable to other applications without a flow meter.

An improved method of detecting the presence of air in a liquid stream and eliminating air from the liquid stream is also disclosed. The improved method comprises providing an air/liquid separator like that disclosed above, optically sensing the presence of air at a predetermined height within the air separation chamber, opening the release valve and closing the liquid outlet valve(s) in response to the sensing of air, and closing the air release valve and opening the liquid outlet valve(s) when liquid is sensed in front of the optical sensor.

BRIEF DESCRIPTION OF THE DRAWINGS

The disclosed embodiments are disclosed more or less diagrammatically in the accompanying drawings, wherein.

It should be understood that the drawings are not necessarily to scale and that the embodiments are sometimes illustrated by graphic symbols, phantom lines and diagrammatic representations. In certain instances, details which are not necessary for an understanding of the disclosed systems and methods or which render other details difficult to perceive may have been omitted. It should be understood, of course, that the concepts disclosed herein are not necessarily limited to the disclosed embodiments.

DETAILED DESCRIPTION OF THE PRESENTLY PREFERRED EMBODIMENTS

Figure 1:
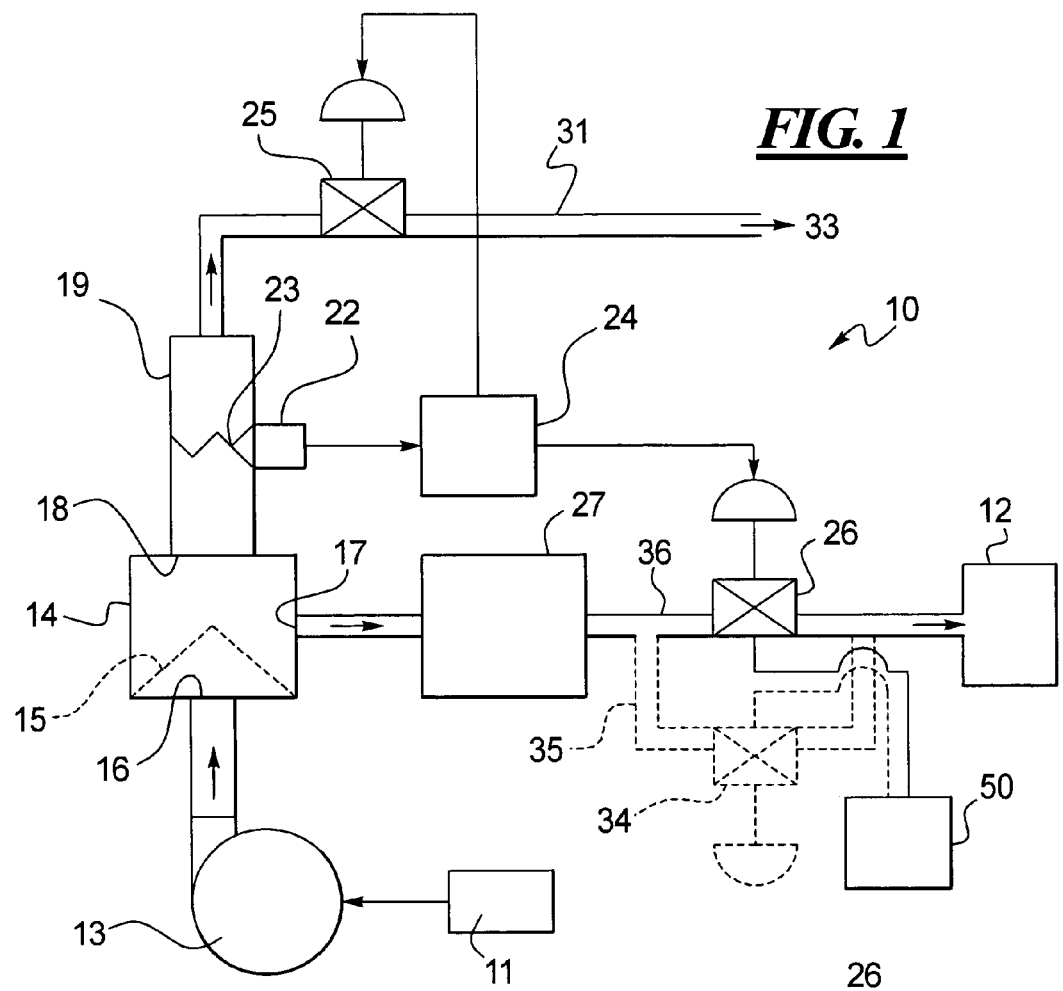
FIG. 1 is a schematic illustration of a air/liquid separator made in accordance with this disclosure.

Turning to FIG. 1, an air/liquid separator system 10 is shown. A reservoir of liquid product 11 is to be delivered to a tank 12 by way of the pump 13. The pump 13 draws fluid from the delivery tank 11 to an intermediate reservoir 14. In preferred embodiments, the reservoir 14 includes the strainer 15 to prevent solid materials or sludge from entering the flow meter and the customer's storage tank 12. The reservoir or chamber 14 includes an inlet 16 for receiving fluid from the pump 13, a liquid outlet 17 and an air/liquid outlet 18. The air/liquid outlet 18 is in communication with an air separation chamber shown at 19.

The air separation chamber 19 includes an optical liquid level sensor 22 which senses air in front of its conical or prismatic tip 23. Essentially, the sensor 22 senses air or an air/liquid interface within the chamber 19. As shown later in FIG. 2, the sensor 22 includes a switch 41 which is either on or off when air is present in front of the prismatic tip 23. The switch 41 in the optical sensor 22 sends a signal to the controller or control mechanism 24. The controller 24 then opens the air release valve 25 and shuts the liquid outlet valve 26. Thus, a mixture of air and liquid is prevented from passing through the flow meter 27 until a requisite amount of air is purged through the air release valve 25 and air outlet line 31 to the atmosphere 33 or suitable containment mechanism (not shown). Conversely, when liquid is disposed in front of the prismatic tip 23 of the optical sensor 22, the switch 41 sends a signal to the controller 24 to close the air release valve 25 and open the liquid outlet valve 26 so that liquid may be delivered through the flow meter 27 to the customer's storage tank 12.

In an alternative embodiment, a low flow rate liquid outlet valve 34 and low flow rate liquid outlet line 35 is disposed in parallel with the liquid outlet valve 26 and liquid outlet line 36. In this embodiment, the low liquid flow rate valve 34 and low flow rate liquid outlet line 35 is used as a throttling mechanism to slow the output of liquid to the customer storage tank when delivering a preset quantity of product.

The control mechanism 24 may be a controller, a relay or a circuit board or other suitable device.

Figure 2:
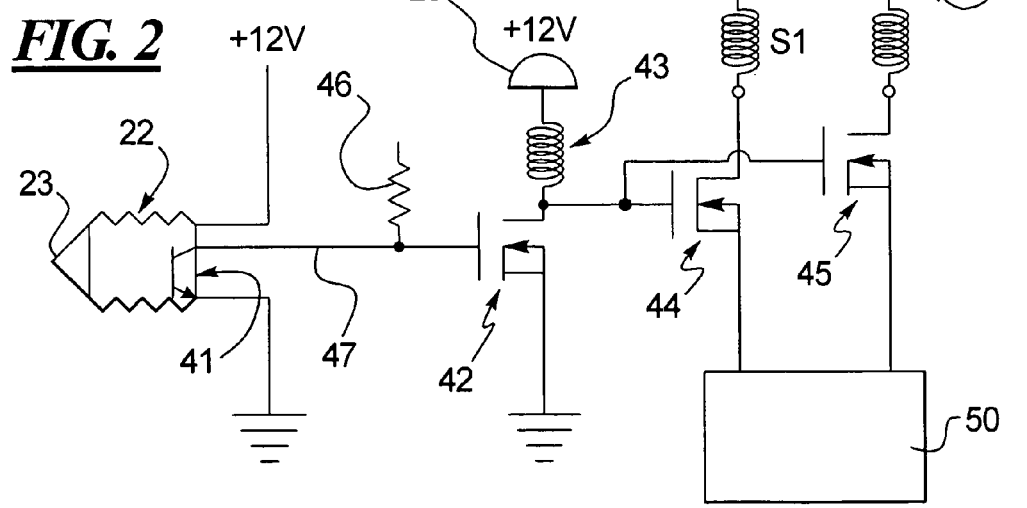
FIG. 2 is a circuit diagram of a preferred embodiment as the disclosed air/liquid separator.

A preferred circuit diagram is illustrated in FIG. 2. The optical sensor 22 includes a twelve volt switch 41 that has an off and an on position. The switch 41 is off when air, air bubbles, or foam are present before the prismatic tip 23 and the switch 41 is on when liquid is present before the prismatic tip 23. In FIG. 2, when the switch 41 is off, the voltage signal from a pullup resistor 46 is communicated to the gate of a transistor 42 which is linked through an induction coil 43 to the air release solenoid valve 25. Thus, in the "off" position, air is present before the optical sensor 22 and the air release valve 25 is opened. Inversion of the signal through the transistor 42 results in a closing of the high flow solenoid valve 26 and/or the low flow solenoid valve 34 by grounding the gates of the transistors 44 and 45. The air release solenoid valve 25 is closed, when the twelve volt switch 41 is in the "on" position, also turning on transistors 44, 45 of the liquid outlet valve 26 and low flow liquid outlet valve 34, allowing the meter register to be in control of the liquid outlet valves. When a predetermined amount is to be delivered, the meter register 50 shuts off the high flow valve 26 and opens the low flow valve 34 just prior to reaching the predetermined amount so that the flow is reduced as the predetermined amount is reached. The register 50 then shuts off the low flow valve 34 when the predetermined amount is reached.

One suitable optical liquid level sensor is sold by Dwyer Instruments, Model No. OLS-10. This sensor is powered by a twelve volt DC power supply and its output is an open collector NPN transistor. When a relay system is employed, the NPN transistor can be connected to a twelve volt coil of a relay. The normally open relay contact can actuate the two-way solenoid air release valve 25 of the air exhaust line 31 and the normally closed relay contact can actuate a three-way solenoid valve 26 of the output line 36. Of course, a reverse configuration is possible. Preferably, the sensor 22 provides the same signal for bubbling liquid and foam as for air. As substantial amounts of air bubbles through the outlet line 36 are not desired. Other suitable sensors include the LEVELPRO™ sensors sold by the Tedeco business unit of Eaton Corporation.

If a flow meter is utilized, one preferred flow meter is the Liquid Controls Model No. M7 equipped with the Model No. LCR-II Electronic Register.

The disclosed systems easily pass the "split compartment" test utilized by many states when monitoring liquid flow meters. In a split compartment test, a compartment of the delivery truck (see the tank 11 in FIG. 1) is drained completely during the delivery causing the pump 13 to suck air and pump it into the metering line 36. To pass the test, the air needs to be exhausted before air can be pushed through the meter 27 which would result in an over registration of liquid flow and an under-delivery of liquid product.

Using the embodiment disclosed above, three separate "split compartment" tests were run with approximately 50 gallons of diesel fuel, thereby depleting the supply tank 11 about half-way through the delivery of 100 gallons. When the compartment 11 was depleted, the disclosed air/liquid separator acted properly in stopping flow and exhausting the pumped air before delivery recommenced through the valves 26 or 34. The complete delivery with a full compartment 11 yielded a metering error of less than 0.1 gallon for the 100 gallons delivered. The test was repeated three times.

Therefore, using the disclosed system, a responsive system in preventing over registration of flow due to pumped air is provided. The disclosed system is cost competitive or lower in cost than presently available systems and the disclosed system is more reliable and less prone to failure than other air separation systems.

From the above description, it is apparent that the deficiencies of the prior art have been overcome. While only certain embodiments have been set forth and described, other alternative embodiments and various modifications will be apparent from the above description to those skilled in the art. These and other alternatives are considered equivalents and are within the spirit and scope of this disclosure.

What is claimed is:

1. A liquid metering system comprising:
    a pump disposed between a liquid supply and a reservoir, the reservoir comprising an inlet connected to the pump, an air/liquid outlet and a liquid outlet, the air/liquid outlet connected to an air separation chamber, the liquid outlet connected to a flow meter and a liquid outlet valve, the air separation chamber connected to an air outlet, the air outlet connected to an air release valve,
    the air separation chamber accommodating an optical liquid level sensor for sensing the presence of air in front thereof within the air separation chamber,
    the optical sensor, air release valve and liquid outlet valve being linked to a controller,
    wherein, when the optical sensor senses air in front thereof, the sensor sends a signal to the controller to open the air release valve and close the liquid outlet valve, and when the optical sensor senses liquid in front thereof, the optical sensor sends a signal to the controller to close the air release valve and open the liquid outlet valve.

2. The system of claim 1 wherein the controller is a relay and when the optical sensor senses air in front thereof, the relay shuts the liquid outlet valve and opens the air release valve and when the optical sensor senses liquid in front thereof, the relay shuts the air release valve and opens the liquid outlet valve.

3. The system of claim 1 wherein the optical sensor comprises a 12 volt switch that is off when air is in front of the optical sensor and that is on when liquid is in front of the optical sensor,
    the air release valve and outlet valves each being solenoid valves, the controller comprises two transistors in series with a first transistor linked to the air release valve and a second transistor linked to the liquid outlet valve,
    wherein when the 12 volt switch of the optical sensor is off, the air release valve is open and the liquid outlet valve is closed and when the 12 volt switch of the optical sensor is on, the liquid outlet valve is open and the air release valve is closed.

4. The system of claim 3 wherein a low flow liquid outlet and low flow liquid outlet valve are connected in parallel to the liquid outlet and the liquid outlet valve, the low flow liquid outlet valve also being a solenoid valve,
    the controller further comprises a third transistor in parallel with the second transistor, the third transistor linked to the low flow liquid outlet valve,
    wherein either the low flow liquid outlet or the primary liquid flow output is closed when air is sensed.

5. The system of claim 1 wherein the optical sensor comprises a 12 volt switch that is on when air is in front of the optical sensor and that is off when liquid is in front of the optical sensor,
    the air release valve and outlet valves each being solenoid valves, the controller comprises two transistors in series with a first transistor linked to the air release valve and a second transistor linked to the liquid outlet valve,
    wherein when the 12 volt switch of the optical sensor is on, the air release valve is open and the liquid outlet valve is closed and when 12 volt switch of the optical sensor is off, the liquid outlet valve is open and the air release valve is closed.

6. The system of claim 5 wherein a low flow liquid outlet and low flow liquid outlet valve are connected in parallel to the liquid outlet and the liquid outlet valve, the low flow liquid outlet valve also being a solenoid valve,
    the controller further comprises a third transistor in parallel with the second transistor, the third transistor linked to the low flow liquid outlet valve,
    wherein either the low flow liquid outlet or the primary liquid flow output is closed when air is sensed.

7. The system of claim 1 wherein the reservoir accommodates a strainer disposed between the inlet and the liquid outlet.

8. The system of claim 1 wherein the optical sensor comprises an optical prism and solid state switch having an off position when air is in front of the optical prism and an on position when liquid is in front of the prism, the optical sensor being mounted through a sidewall of the air separation chamber.

9. The system of claim 1 wherein the optical sensor comprises an optical prism and solid state switch having an on position when air is in front of the optical prism and an off position when liquid is in front of the prism, the optical sensor being mounted through a sidewall of the air separation chamber.

10. The system of claim 1 wherein the air separation chamber is disposed directly on top of the reservoir.

11. An air/liquid separator comprising:
a pump connected to a reservoir, the reservoir comprising an inlet connected to the pump, an air/liquid outlet and a liquid outlet, the air/liquid outlet connected to a air separation chamber, the liquid outlet connected to a liquid outlet valve, the air separation chamber connected to an air outlet, the air outlet connected to an air release valve,
the air separation chamber accommodating an optical sensor for sensing the presence of air in front thereof within the air separation chamber,
optical sensor, air release valve and liquid outlet valve being linked to a controller,
wherein, when the optical sensor senses air in front thereof, the sensor sends a signal to the controller to open the air release valve and close the liquid outlet valve, and when the optical sensor senses liquid in front thereof, the optical sensor sends a signal to the controller to close the air release valve and open the liquid outlet valve.

12. The system of claim 11 wherein the controller is a relay and when the optical sensor senses air in front thereof, the relay shuts the liquid outlet valve and opens the air release valve and when the optical sensor senses liquid in front thereof, the relay shuts the air release valve an opens the liquid outlet valve.

13. The system of claim 11 wherein the optical sensor comprises a 12 volt switch that is off when air is in front of the optical sensor and that is on when liquid is in front of the optical sensor,
the air release valve and outlet valves each being solenoid valves, the controller comprises two transistors in series with a first transistor linked to the air release valve and a second transistor linked to the liquid outlet valve,
wherein when the 12 volt switch of the optical sensor is off, the air release valve is open and the liquid outlet valve is closed and when the 12 volt switch of the optical sensor is on, the liquid outlet valve is open and the air release valve is closed.

14. The system of claim 13 wherein a low flow liquid outlet and low flow liquid outlet valve are connected in parallel to the liquid outlet and the liquid outlet valve, the low flow liquid outlet valve also being a solenoid valve,
the controller further comprises a third transistor in parallel with the second transistor, the third transistor linked to the low flow liquid outlet valve,
wherein either the low flow liquid outlet or the primary liquid flow output is closed when air is sensed.

15. The system of claim 11 wherein the optical sensor comprises a 12 volt switch that is on when air is in front of the optical sensor and that is off when liquid is in front of the optical sensor,
the air release valve and outlet valves each being solenoid valves, the controller comprises two transistors in series with a first transistor linked to the air release valve and a second transistor linked to the liquid outlet valve,
wherein when the 12 volt switch of the optical sensor is on, the air release valve is open and the liquid outlet valve is closed and when 12 volt switch of the optical sensor is off, the liquid outlet valve is open and the air release valve is closed.

16. The system of claim 15 wherein a low flow liquid outlet and low flow liquid outlet valve are connected in parallel to the liquid outlet and the liquid outlet valve, the low flow liquid outlet valve also being a solenoid valve,
the controller further comprises a third transistor in parallel with the second transistor, the third transistor linked to the low flow liquid outlet valve,
wherein either the low flow liquid outlet or the primary liquid flow output is closed when air is sensed.

17. The system of claim 11 wherein the reservoir accommodates a strainer disposed between the inlet and the liquid outlet.

18. The system of claim 11 wherein the optical sensor comprises an optical prism and solid state switch having an off position when air is in front of the optical prism and an on position when liquid is in front of the prism, the optical sensor being mounted through a sidewall of the air separation chamber.

19. The system of claim 11 wherein the optical sensor comprises an optical prism and solid state switch having an on position when air is in front of the optical prism and an off position when liquid is in front of the prism, the optical sensor being mounted through a sidewall of the air separation chamber.

20. The system of claim 11 wherein the air separation chamber is disposed directly on top of the reservoir.

21. A method for separating air from liquid that is being pumped through a reservoir, the method comprising:
providing an air/liquid separator comprising a pump connected to a reservoir, the reservoir comprising an inlet connected to the pump, an air/liquid outlet and a liquid outlet, the air/liquid outlet connected to an air separation chamber, the liquid outlet connected to a liquid outlet valve, the air separation chamber connected to an air outlet, the air outlet connected to an air release valve;
optically sensing the presence of air at a predetermined height in the air separation chamber;
when the optical sensor senses air in front thereof, opening the air release valve and closing the liquid outlet valve; and
when the optical sensor senses liquid in front thereof, closing the air release valve and opening the liquid outlet valve.

22. The method of claim 21 wherein the air liquid separator further comprises a low flow liquid outlet and low flow liquid outlet valve are connected in parallel to the liquid outlet and the liquid outlet valve.

* * * * *

UNITED STATES PATENT AND TRADEMARK OFFICE
CERTIFICATE OF CORRECTION

| | | |
|---|---|---|
| PATENT NO. | : 7,000,628 B2 | Page 1 of 1 |
| APPLICATION NO. | : 10/764964 | |
| DATED | : June 26, 2004 | |
| INVENTOR(S) | : Ruesch et al. | |

It is certified that error appears in the above-identified patent and that said Letters Patent is hereby corrected as shown below:

Claim 12, Column 7, Lines 30-31: Please delete "the relay shuts the air release valve an opens the liquid valve" and replace with --the relay shuts the air release valve and opens the liquid valve--

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,000,628 B2 | Page 1 of 1 |
| APPLICATION NO. | : 10/764964 | |
| DATED | : February 21, 2006 | |
| INVENTOR(S) | : Ruesch et al. | |

It is certified that error appears in the above-identified patent and that said Letters Patent is hereby corrected as shown below:

Claim 12, Column 7, Lines 30-31: Please delete "the relay shuts the air release valve an opens the liquid valve" and replace with --the relay shuts the air release valve and opens the liquid valve--

This certificate supersedes Certificate of Correction issued June 5, 2007.

Signed and Sealed this

Third Day of July, 2007

JON W. DUDAS
*Director of the United States Patent and Trademark Office*